July 23, 1963

G. D. HEDGES 3,098,400

POWER TRANSMISSION

Filed May 27, 1960

INVENTOR.
GEORGE D. HEDGES
BY George W. Field
ATTORNEY

United States Patent Office 3,098,400
Patented July 23, 1963

3,098,400
POWER TRANSMISSION
George D. Hedges, Roseville, Minn., assignor to Minneapolis-Honeywell Regulator Company, Minneapolis, Minn., a corporation of Delaware
Filed May 27, 1960, Ser. No. 32,409
4 Claims. (Cl. 74—804)

This invention relates to the field of power transmission, and more particularly to reduction gearing. It is the object of this invention to provide a novel gear reduction arrangement having a very high gear ratio, low backlash, and small volume.

Various other objects, advantages, and features of novelty not particularly enumerated above which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described certain preferred embodiments of my invention.

Figure 1:
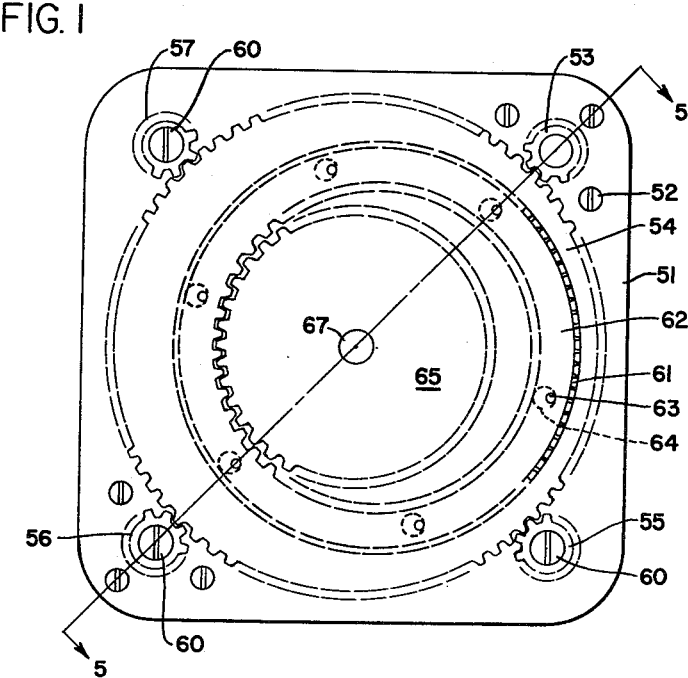
Figure 2:
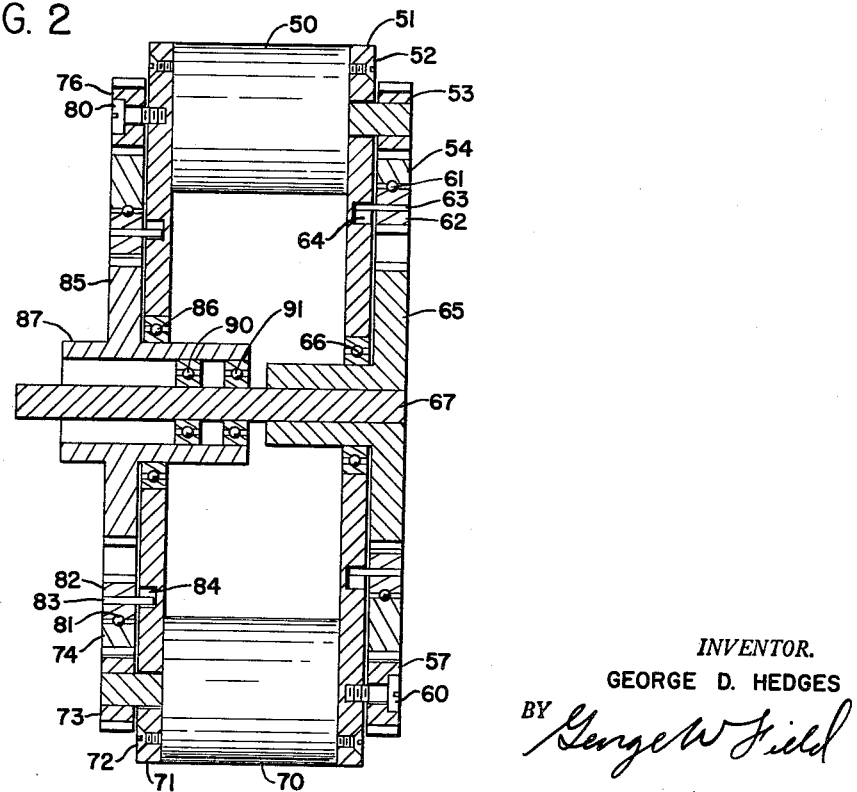

In the drawing FIGURE 1 is an elevation of an assembly showing my invention, and FIGURE 2 is a section taken along the line 5—5 of FIGURE 1.

As shown in FIGURE 1, a drive motor 50 is mounted on a base plate 51 by suitable screws 52, and carries a pinion 53 which meshes with an eccentric gear 54 carried in idler gears 55, 56 and 57 mounted by suitable means 60 on plate 51. Gear 54 is eccentrically bored to receive, through the intermediary of an anti-friction bearing 61, the outer rim of a rigid internal gear 62, having pins 63 projecting into apertures 64 in plate 51 to permit gear 62 to revolve about the center of gear 54 without rotation about its own axis. Gear 62 meshes with an output gear 65, which is mounted in a bearing 66 in plate 51 at the center of gear 54, and carries an output shaft 67. The mesh point between gears 62 and 65 moves once about the inner periphery of gear 62 for each rotation of gear 54, and gear 65 is thus advanced by the difference between the number of teeth in gear 62 and the number of teeth in gear 65, the overall reduction being further increased by the ratio of gear 54 to pinion 53.

A second motor 70 is fastened to a second base plate 71 by suitable means 72. Motor 71 carries a pinion 73 which meshes with an eccentric gear 74 carried in idler gears, including gear 76, mounted by suitable means 80 on base plate 71. Base plates 51 and 71 are fastened together by motors 50 and 70, and by suitable further spacers which may be associated with elements 60 and 80. Gear 74 is eccentrically bored to receive, through the intermediary of an anti-friction bearing 81, the outer rim of a rigid internal gear 82, having pins 83 projecting into apertures 84 in plate 72 to permit gear 82 to revolve about the center of gear 74 without rotation about its own axis. Gear 82 meshes with an output gear 85 mounted in a bearing 86 in plate 71 at the center of gear 74, and carries an output hub 87. The mesh point between gears 82 and 85 moves once about the periphery of gear 85 for each rotation of gear 74, and gear 85 is thus advanced by the difference between the number of teeth in gear 82 and the number of teeth in gear 85, the overall reduction being further increased by the ratio of gear 74 to pinion 73.

Hub 87 is bored to receive a pair of bearings 90 and 91, through which shaft 67 projects. Hub 87 may carry a dial and shaft 67 a needle movable with respect thereto, or a pair of needles may be carried by hub 87 and shaft 67 for motion with respect to a fixed dial, or hub 87 and shaft 67 may be connected to the input arms of a mechanical differential, according to the desire of the user, since the structure shown is compact and specifically designed for uses of this sort.

Numerous objects and advantages of my invention have been set forth in the foregoing description, together with details of the structure and function of the invention, and the novel features thereof are pointed out in the appended claims. The disclosure, however, is illustrative only, and I may make changes in detail, especially in matters of shape, size, and arrangement of parts, within the principle of the invention, to the full extent indicated by the broad general meaning of the terms in which the appended claims are expressed.

I claim as my invention:

1. In combination: a circular internally toothed ring gear having an outer rim concentric with the pitch circle of the internal teeth; a circular externally toothed gear continuously meshing with said ring gear and having a pitch circle of smaller diameter; means mounting said ring gear for movement consisting of revolution about the center of said externally toothed gear without substantial rotation about its own center; and drive means including a drive member mounted for rotation about the center of said externally toothed gear and having an eccentric bore including anti-friction means adapted to receive said rim without substantial play, so that rotation of said drive member causes said movement of said ring gear.

2. In combination: a circular internally toothed ring gear having an outer rim concentric with the pitch circle of the internal teeth; a circular externally toothed gear continuously meshing with said ring gear and having a pitch circle of smaller diameter; means mounting said ring gear for movement consisting of revolution about the center of said externally toothed gear without substantial rotation about its own center; and drive means including a drive member mounted for rotation about the center of said externally toothed gear and having an eccentric bore adapted to receive said rim without substantial play, so that rotation of said drive member causes said movement of said ring gear.

3. In combination: a circular internally toothed ring gear having an outer rim concentric with the pitch circle of the internal teeth; a circular externally toothed gear continuously meshing with said ring gear and having a pitch circle of smaller diameter; means mounting said ring gear for movement consisting of revolution about the center of said externally toothed gear without substantial rotation about its own center; and eccentric drive means engaging said rim to cause said movement of said ring gear.

4. In combination: a circular internally toothed ring gear having an outer rim concentric with the pitch circle of the internal teeth; a circular externally toothed gear continuously meshing with said ring gear and having a pitch circle of smaller diameter; means mounting said ring gear for movement consisting of revolution about the center of said externally toothed gear without substantial rotation about its own center; and drive means engaging said rim to cause said movement of said ring gear.

References Cited in the file of this patent

UNITED STATES PATENTS

| | | |
|---|---|---|
| 606,157 | Belanger | June 21, 1898 |
| 757,333 | Moore | Apr. 12, 1904 |
| 946,253 | Moore | Jan. 11, 1910 |
| 1,590,166 | Howard | June 22, 1926 |
| 1,811,624 | Ford | June 23, 1931 |
| 2,170,951 | Perry | Aug. 29, 1939 |
| 2,313,132 | Elliott | Mar. 9, 1943 |
| 2,475,504 | Jackson | July 5, 1949 |
| 2,508,121 | McIver | May 10, 1950 |
| 2,532,992 | Browne | Dec. 5, 1950 |
| 2,831,373 | Weis | Apr. 22, 1958 |
| 2,868,039 | Lee | Jan. 13, 1959 |
| 2,931,249 | Musser | Apr. 5, 1960 |
| 3,033,060 | Nemec | May 8, 1962 |